US011324320B2

(12) United States Patent
Chen (10) Patent No.: US 11,324,320 B2
(45) Date of Patent: May 10, 2022

(54) FOLDABLE CUSHION FUNCTIONING AS CHAIR

(71) Applicant: Te-Lung Chen, Tainan (TW)

(72) Inventor: Te-Lung Chen, Tainan (TW)

( * ) Notice: Subject to any disclaimer, the term of this patent is extended or adjusted under 35 U.S.C. 154(b) by 0 days.

(21) Appl. No.: 17/160,608

(22) Filed: Jan. 28, 2021

(65) Prior Publication Data

US 2022/0022653 A1   Jan. 27, 2022

(30) Foreign Application Priority Data

Jul. 24, 2020   (TW) .................................. 109125138

(51) Int. Cl.
| | |
|---|---|
| *A47C 1/14* | (2006.01) |
| *A47C 3/12* | (2006.01) |
| *A47C 3/16* | (2006.01) |
| *B60N 2/60* | (2006.01) |
| *A47C 5/00* | (2006.01) |
| *A47C 7/54* | (2006.01) |
| *A47C 4/42* | (2006.01) |
| *A47C 7/14* | (2006.01) |

(Continued)

(52) U.S. Cl.
CPC ................ *A47C 3/12* (2013.01); *A47C 1/146* (2013.01); *A47C 3/16* (2013.01); *A47C 4/18* (2013.01); *A47C 4/286* (2013.01); *A47C 4/42* (2013.01); *A47C 5/005* (2013.01); *A47C 7/021* (2013.01); *A47C 7/0213* (2018.08); *A47C 7/14* (2013.01); *A47C 7/541* (2018.08); *B60N 2/6063* (2013.01); *A47C 31/11* (2013.01)

(58) Field of Classification Search
CPC .. A47C 1/146; A47C 3/10; A47C 3/12; A47C 3/16; A47C 7/021; A47C 7/20714; A47C 7/0213; A47C 31/11; A47C 5/005
USPC .... 297/16.1, 162.1, 219.1, 228.11, 350, 351, 297/377, 380
See application file for complete search history.

(56) References Cited

U.S. PATENT DOCUMENTS 1,140,997 A * 5/1915 Minehart ............... A47C 1/146
190/8
2,605,817 A * 8/1952 Craig-Wallace ..... A47C 20/027
297/380

(Continued)

FOREIGN PATENT DOCUMENTS

| | | | | |
|---|---|---|---|---|
| CN | 202445577 U | * | 9/2012 | |
| FR | 2742320 A1 | * | 6/1997 | ............... A47C 3/16 |

(Continued)

*Primary Examiner* — Robert Canfield
(74) *Attorney, Agent, or Firm* — Karin L. Williams; Alan D. Kamrath; Mayer & Williams PC (57) ABSTRACT

A foldable cushion includes a cushion mechanism and a connecting mechanism. The cushion mechanism includes a seat unit and a back unit. The seat unit and the back unit are juxtaposed and movable relative to each other along a transverse folding line. The connecting mechanism includes a first endless cord and a second endless cord. The first endless cord and the second endless cord respectively extend through the transverse folding line and are flexibly arranged on the seat unit and the back unit. When the seat unit and the back unit are moved relative to the transverse folding line, the first endless cord and the second endless cord are stretched, so that the seat unit and the back unit are positioned at an expanded state by the elastic force of the first endless cord and the second endless cord.

10 Claims, 7 Drawing Sheets

(51) Int. Cl.
*A47C 4/18* (2006.01)
*A47C 4/28* (2006.01)
*A47C 7/02* (2006.01)
*A47C 31/11* (2006.01)

(56) References Cited

U.S. PATENT DOCUMENTS

| | | | | | |
|---|---|---|---|---|---|
| 3,519,307 | A | * | 7/1970 | Gittings | A47C 7/021 297/380 |
| 3,902,753 | A | * | 9/1975 | Wilson | A47C 1/143 297/185 |
| 4,181,356 | A | * | 1/1980 | Fleischer | A47C 1/146 248/370 |
| 4,396,227 | A | * | 8/1983 | Neilson | B60N 2/609 297/228.11 |
| 4,775,188 | A | * | 10/1988 | Fuchs | A47C 1/146 297/129 |
| 4,824,171 | A | * | 4/1989 | Hollingsworth | A47C 1/146 297/351 |
| 5,052,965 | A | * | 10/1991 | Klapp | A47C 15/006 441/130 |
| 5,205,610 | A | * | 4/1993 | Reninger | A45C 9/00 297/17 |
| 5,265,292 | A | * | 11/1993 | Underell | A47C 4/52 297/380 |
| 5,384,923 | A | * | 1/1995 | Hwang | A47C 1/143 5/419 |
| 6,848,746 | B2 | * | 2/2005 | Gentry | A47C 7/021 297/380 |
| 2016/0113403 | A1 | * | 4/2016 | Lee | A47C 4/42 297/16.2 |

FOREIGN PATENT DOCUMENTS

| | | | | | |
|---|---|---|---|---|---|
| JP | 2011005154 | A | * | 1/2011 | A47C 5/005 |
| KR | 200492815 | Y1 | * | 12/2020 | A47C 1/146 |
| WO | WO-9959452 | A1 | * | 11/1999 | A47G 9/062 |
| WO | WO-0239851 | A1 | * | 5/2002 | A47C 5/005 |
| WO | WO-03034873 | A1 | * | 5/2003 | B60N 2/2866 |

* cited by examiner

FOLDABLE CUSHION FUNCTIONING AS CHAIR

BACKGROUND OF THE INVENTION

1. Field of the Invention

The present invention relates to a cushion and, more particularly, to a foldable cushion.

2. Description of the Related Art

A conventional foldable cushion comprises a plurality of panels mutually juxtaposed along a folding line, and a plurality of hinges arranged between panels. The panels are moved relative to the folding line by pivotal action of the hinges so that the conventional foldable cushion is changed between an expanded state and a folded state. When the conventional foldable cushion is disposed at the expanded state, the panels form a space to allow seating of the user. However, the hinges are made of metal material so that the conventional foldable cushion has a heavy weight. Thus, the user cannot carry the conventional foldable cushion easily. In addition, the hinges will be dusted due to moisture when the conventional foldable cushion is used outdoors, so that the hinges are easily worn out during a long-term utilization, thereby greatly decreasing the lifetime of the conventional foldable cushion.

BRIEF SUMMARY OF THE INVENTION

The primary objective of the present invention is to provide a foldable cushion functioning as a chair or a seat.

In accordance with the present invention, there is provided a foldable cushion comprising a cushion mechanism and a connecting mechanism. The cushion mechanism includes a seat unit and a back unit. Each of the seat unit and the back unit has a sheet plate shape. The seat unit and the back unit are juxtaposed and movable relative to each other along a transverse folding line. The connecting mechanism includes a first endless cord and a second endless cord. The first endless cord and the second endless cord respectively extend through the transverse folding line and are flexibly arranged on the seat unit and the back unit. The first endless cord surrounds the second endless cord. When the seat unit and the back unit are moved outward relative to the transverse folding line, the first endless cord and the second endless cord are stretched, so that the seat unit and the back unit are positioned at an expanded state with a predetermined angle defined therebetween by an elastic force of the first endless cord and the second endless cord.

According to the primary advantage of the present invention, the first endless cord and the second endless cord are light so that the foldable cushion has a light weight, thereby facilitating the user storing and carrying the foldable cushion.

According to another advantage of the present invention, the first endless cord and the second endless cord are dustproof so that the foldable cushion is not dusted easily.

According to a further advantage of the present invention, the first endless cord and the second endless cord are assembled easily.

Further benefits and advantages of the present invention will become apparent after a careful reading of the detailed description with appropriate reference to the accompanying drawings.

DETAILED DESCRIPTION OF THE INVENTION

Figure 1:
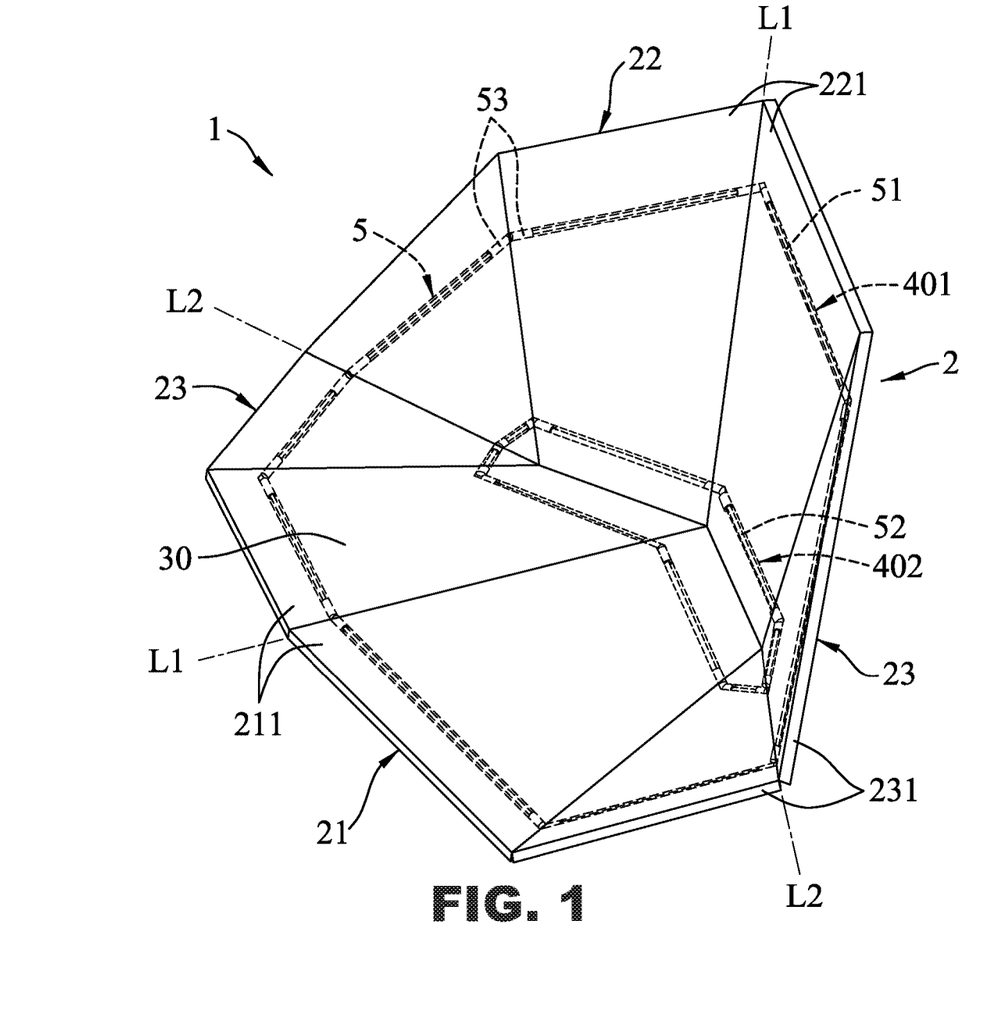
FIG. 1 is a perspective view showing an expanded state of a foldable cushion in accordance with the first preferred embodiment of the present invention.
Figure 2:
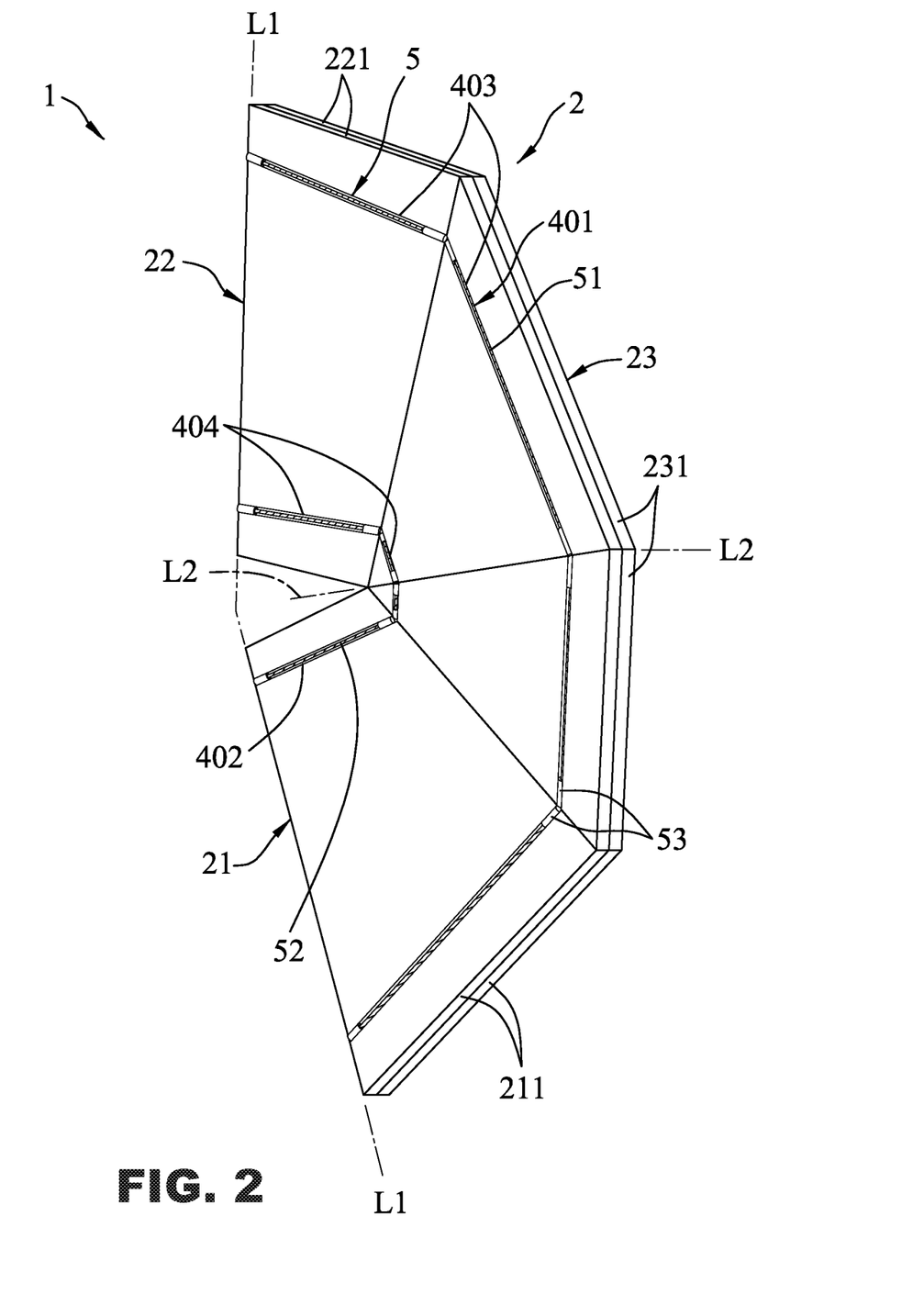
FIG. 2 is a perspective view showing that the foldable cushion is folded along a first longitudinal folding line.
Figure 3:
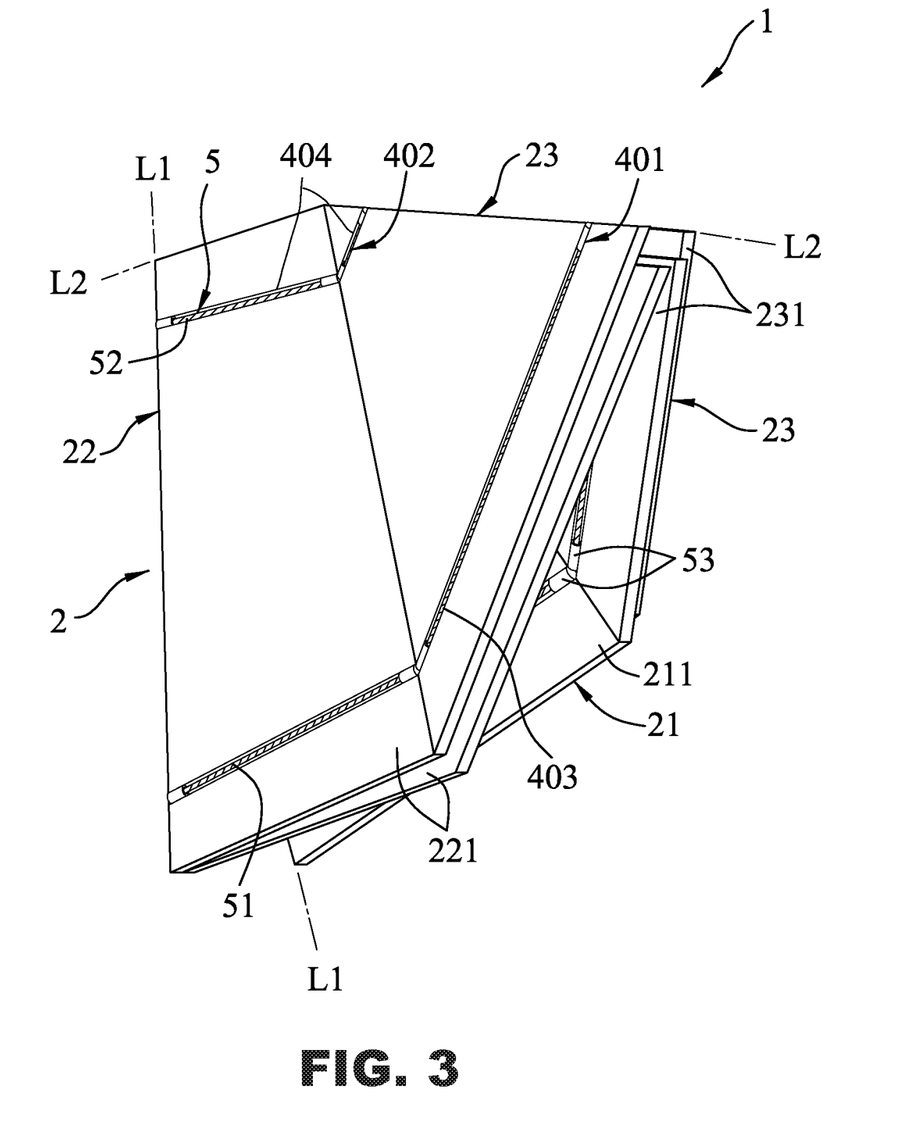
FIG. 3 is a perspective view showing a folded state of the foldable cushion in accordance with the first preferred embodiment of the present invention.

Referring to the drawings and initially to FIGS. 1-3, a foldable cushion 1 in accordance with the preferred embodiment of the present invention comprises a cushion mechanism 2 and a connecting mechanism 5.

The cushion mechanism 2 includes a seat unit 21 and a back unit 22. Each of the seat unit 21 and the back unit 22 has a sheet plate shape. The seat unit 21 and the back unit 22 are juxtaposed and movable (or pivotable or swingable or swivelable) relative to each other along a transverse folding line L2. The connecting mechanism 5 includes a first endless cord 51 and a second endless cord 52. The first endless cord 51 and the second endless cord 52 respectively extend through the transverse folding line L2 and are flexibly arranged on the seat unit 21 and the back unit 22. The first endless cord 51 surrounds the second endless cord 52. In practice, when the seat unit 21 and the back unit 22 are swung and moved outward relative to the transverse folding line L2, the first endless cord 51 and the second endless cord 52 are stretched, so that the seat unit 21 and the back unit 22 are positioned at an expanded state with a predetermined angle defined therebetween by an elastic force of the first endless cord 51 and the second endless cord 52.

In the preferred embodiment of the present invention, the cushion mechanism 2 further includes a first longitudinal folding line L1 intersecting the transverse folding line L2. The seat unit 21 includes two seat plates 211 that are juxtaposed and movable (or pivotable or swingable or swivelable) relative to each other along the first longitudinal folding line L1. The back unit 22 includes two backrest plates 221 that are movable (or pivotable or swingable or swivelable) relative to each other along the first longitudinal folding line L1. The first endless cord 51 and the second endless cord 52 respectively extend through the first longitudinal folding line L1 and are arranged on the two seat plates 211 and the two backrest plates 221. Thus, the cushion mechanism 2 is foldable along the transverse folding line L2 and the first longitudinal folding line L1 from the expanded state to a folded state in which the two seat plates 211 and the two backrest plates 221 are overlapped and stacked.

In the preferred embodiment of the present invention, the cushion mechanism 2 further includes two arm units 23 respectively juxtaposed to the seat unit 21 and the back unit 22. The two arm units 23 are located at two opposite sides of each of the seat unit 21 and the back unit 22. Each of the two arm units 23 includes two arm plates 231 that are juxtaposed and movable (or pivotable or swingable or swivelable) relative to each other along the transverse folding line L2. The first endless cord 51 and the second endless cord 52 respectively extend through the seat unit 21, the back unit 22, and the two arm units 23. In practice, when the cushion mechanism 2 is changed from the folded state to the expanded state, the first endless cord 51 and the second endless cord 52 are stretched, and the seat unit 21, the back unit 22, and the two arm units 23 are driven and expanded by the first endless cord 51 and the second endless cord 52, so that the two seat plates 211 of the seat unit 21, the two backrest plates 221 of the back unit 22, and the two arm plates 231 of each of the two arm units 23 are juxtaposed with a predetermined angle therebetween.

In the preferred embodiment of the present invention, the cushion mechanism 2 further includes a first endless groove 401 and a second endless groove 402 each formed in the seat unit 21, the back unit 22, and the two arm units 23. The first endless cord 51 is retained in the first endless groove 401, and the second endless cord 52 is retained in the second endless groove 402.

In the preferred embodiment of the present invention, the first endless groove 401 has a plurality of first slots 403 respectively formed in the two seat plates 211 of the seat unit 21, the two backrest plates 221 of the back unit 22, and the two arm plates 231 of each of the two aim units 23. The first slots 403 are connected to each other. The second endless groove 402 has a plurality of second slots 404 respectively formed in the two seat plates 211 of the seat unit 21, the two backrest plates 221 of the back unit 22, and the two arm plates 231 of each of the two aim units 23. The second slots 404 are connected to each other. The connecting mechanism 5 further includes a plurality of mounting tubes 53 received in the first slots 403 and the second slots 404 and mounted on the first endless cord 51 and the second endless cord 52.

In the preferred embodiment of the present invention, the two seat plates 211 of the seat unit 21, the two backrest plates 221 of the back unit 22, and the two arm plates 231 of each of the two arm units 23 have a determined stiffness (or rigidity).

In the preferred embodiment of the present invention, the first endless cord 51 and the second endless cord 52 are flexibly arranged on the two arm units 23.

In the preferred embodiment of the present invention, the first endless cord 51 extends through the mounting tubes 53 situated in the first slots 403 and is inserted into the first endless groove 401, and the second endless cord 52 extends through the mounting tubes 53 situated in the second slots 404 and is inserted into the second endless groove 402.

In the preferred embodiment of the present invention, when the cushion mechanism 2 is driven, the cushion mechanism 2 is changed between the expanded state and the folded state. When the cushion mechanism 2 is disposed at the expanded state, the seat unit 21, the back unit 22, and the two arm units 23 are expanded relatively along the first longitudinal folding line L1 and the transverse folding line L2, so that the two seat plates 211 of the seat unit 21, the two backrest plates 221 of the back unit 22, and the two arm plates 231 of each of the two arm units 23 are expanded and juxtaposed to each other with a determined angle therebetween, thereby defining a sitting (or seated) space 30 therebetween. When the cushion mechanism 2 is disposed at the folded state, the cushion mechanism 2 is folded and stacked leftward and rightward along the first longitudinal folding line L1, and is then folded and stacked upward and downward along the transverse folding line L2. Alternatively, when the cushion mechanism 2 is disposed at the folded state, the cushion mechanism 2 is folded and stacked upward and downward along the transverse folding line L2, and is then folded and stacked leftward and rightward along the first longitudinal folding line L1.

In operation, the foldable cushion 1 of the folded state is placed on a determined site, such as a flat ground, lawn, meadow or pasture. Then, the cushion mechanism 2 is unfolded and expanded along the transverse folding line L2. Then, the cushion mechanism 2 is unfolded and expanded along the first longitudinal folding line L1. Thus, the foldable cushion 1 is fully expanded as shown in FIG. 1. At this time, the first endless cord 51 and the second endless cord 52 are stretched and supported by the seat unit 21, the back unit 22, and the two arm units 23, so that the two seat plates 211 of the seat unit 21, the two backrest plates 221 of the back unit 22, and the two arm plates 231 of each of the two arm units 23 are restricted by the elastic force of the first endless cord 51 and the second endless cord 52 and are juxtaposed closely with a predetermined angle therebetween. Thus, the cushion mechanism 2 is kept at the expanded state steadily so that the user may be seated in the sitting space 30.

When the foldable cushion 1 is not in use, the cushion mechanism 2 is folded and stacked leftward and rightward along the first longitudinal folding line L1 as shown in FIG. 2, and is then folded and stacked upward and downward along the transverse folding line L2 as shown in FIG. 3, so that the cushion mechanism 2 is changed to the folded state, In the preferred embodiment of the present invention, the first endless groove 401 and the second endless groove 402 are opposite to the sitting space 30.

In the preferred embodiment of the present invention, the first endless cord 51 and the second endless cord 52 are made of elastic material.

Figure 4:
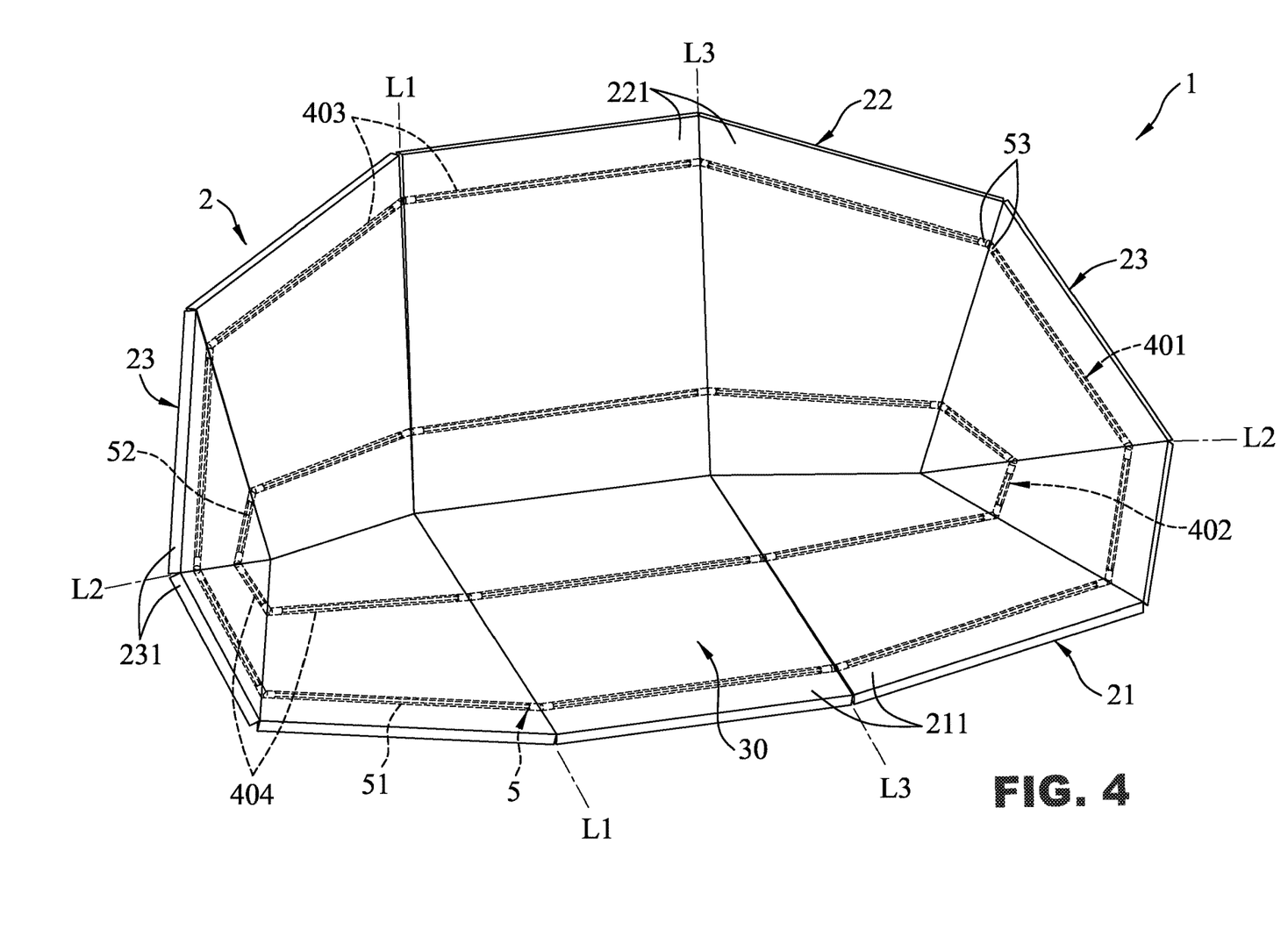
FIG. 4 is a perspective view showing an expanded state of a foldable cushion in accordance with the second preferred embodiment of the present invention.
Figure 5:
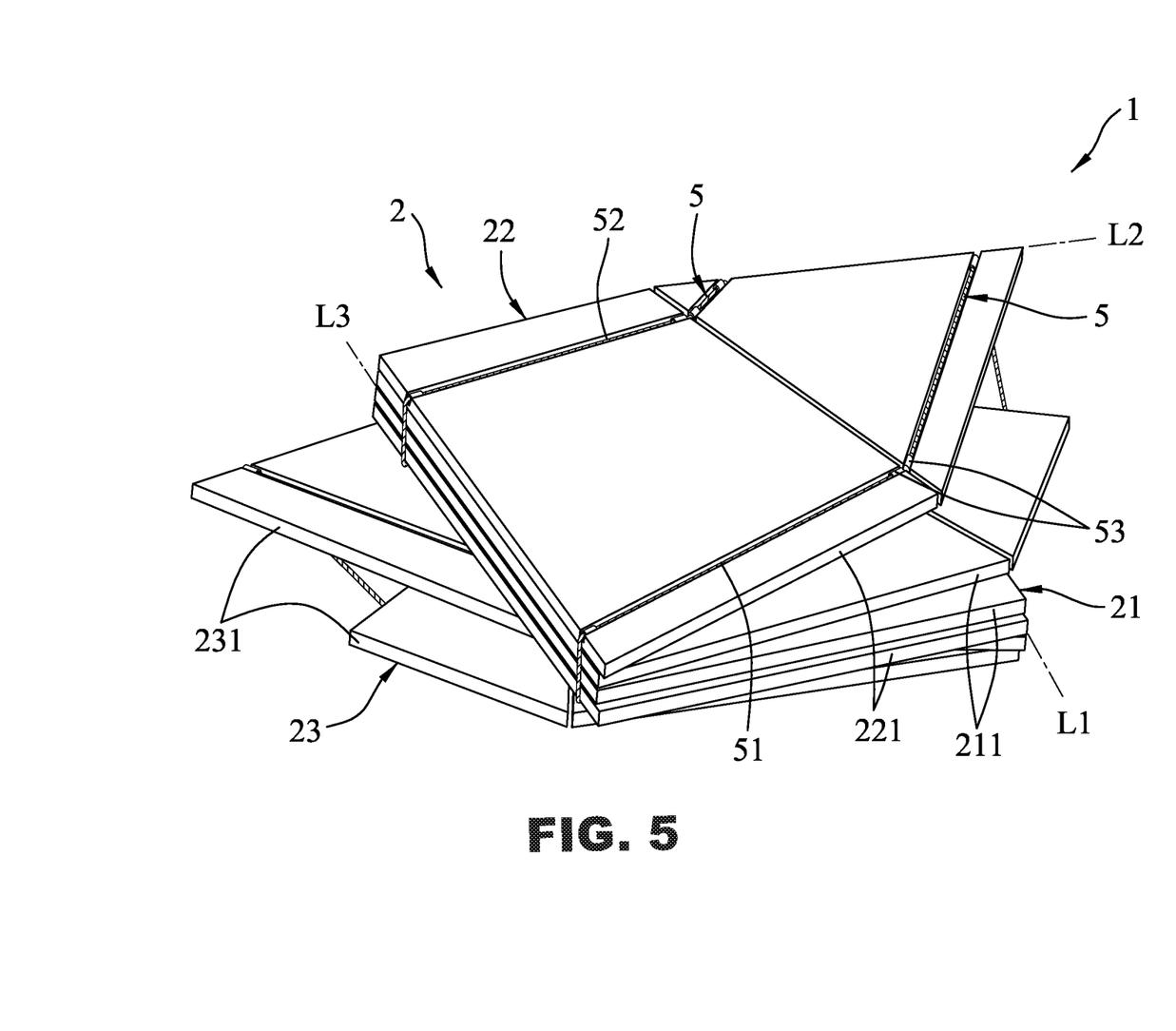
FIG. 5 is a perspective view showing a folded state of the foldable cushion in accordance with the second preferred embodiment of the present invention.

Referring to FIGS. 4 and 5, the cushion mechanism 2 further includes a second longitudinal folding line L3 intersecting the transverse folding line L2 and spaced from the first longitudinal folding line L1. The seat unit 21 includes three seat plates 211 that are juxtaposed and movable (or pivotable or swingable or swivelable) relative to each other along the first longitudinal folding line L1 and the second longitudinal folding line L3. The back unit 22 includes three backrest plates 221 that are movable (or pivotable or swingable or swivelable) relative to each other along the first longitudinal folding line L1 and the second longitudinal folding line L3.

The first endless cord 51 and the second endless cord 52 respectively extend through the first longitudinal folding line L1 and the second longitudinal folding line L3, and are arranged on the two seat plates 211 and the two backrest plates 221. Thus, the cushion mechanism 2 is foldable along the transverse folding line L2, the first longitudinal folding line L1 and the second longitudinal folding line L3 from the expanded state to a folded state in which the two seat plates 211 and the two backrest plates 221 are overlapped and stacked.

When the cushion mechanism 2 is disposed at the folded state, the cushion mechanism 2 is folded and stacked upward and downward along the transverse folding line L2, and is then folded and stacked leftward and rightward along the first longitudinal folding line L1 and the second longitudinal folding line L3.

Figure 6:
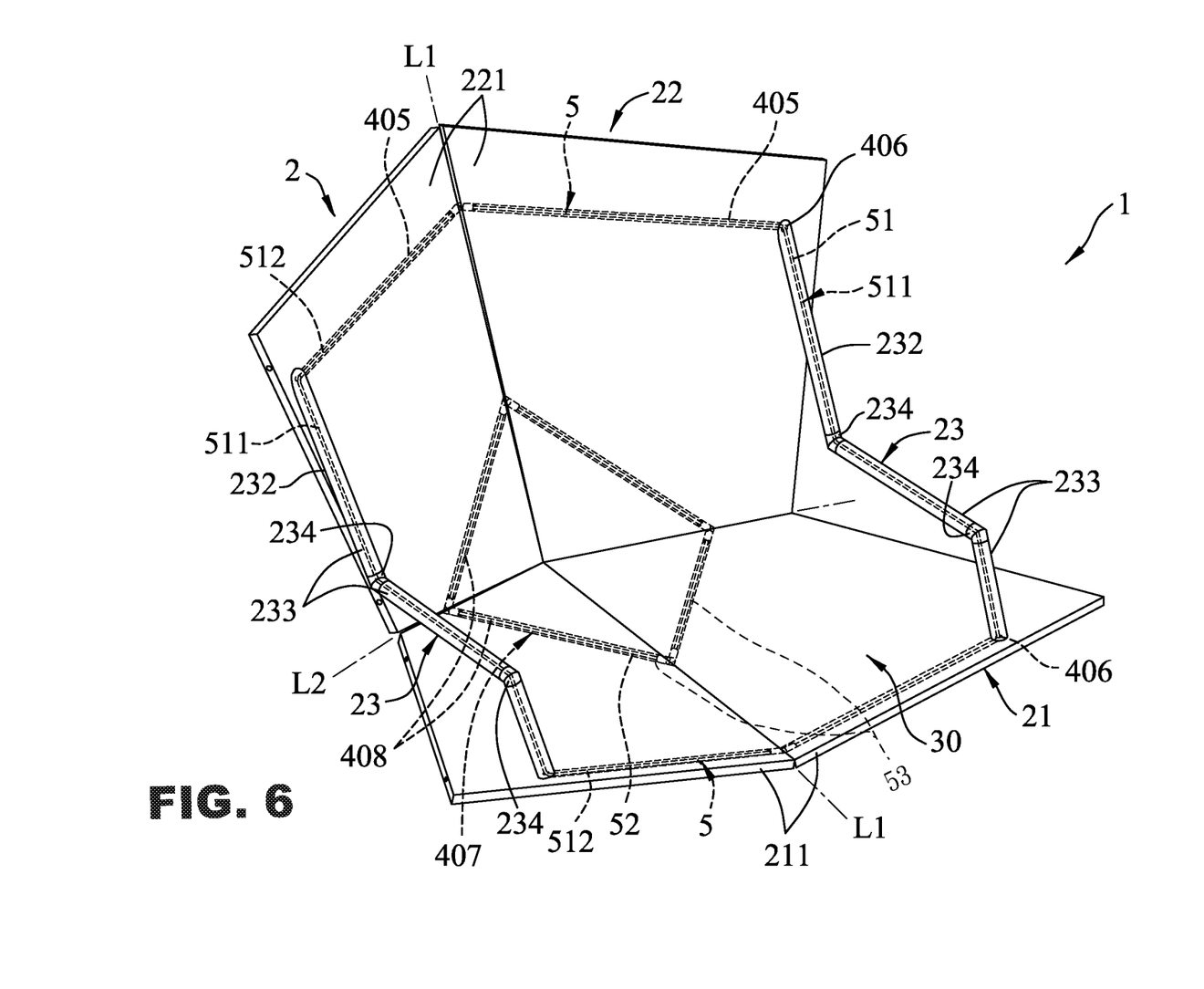
FIG. 6 is a perspective view showing an expanded state of a foldable cushion in accordance with the third preferred embodiment of the present invention.
Figure 7:
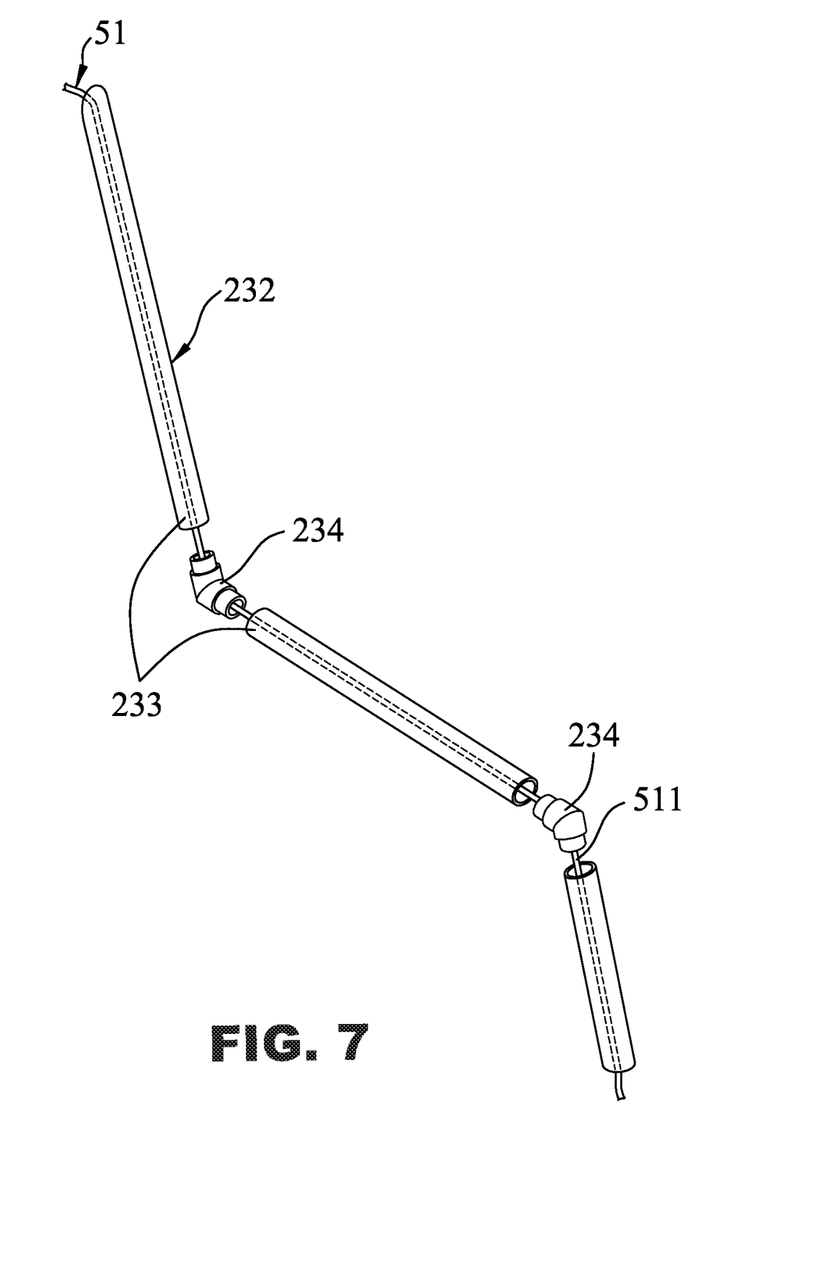
FIG. 7 is a perspective view showing a tube module of the foldable cushion in accordance with the third preferred embodiment of the present invention.

Referring to FIGS. 6 and 7, the first endless cord 51 has two armrest sections 511. The two armrest sections 511 are stretched and exposed from the seat unit 21 and the back unit 22 when the cushion mechanism 2 is disposed at the expanded state. The cushion mechanism 2 further includes two tube modules 232 mounted on the two armrest portions 511 and arranged between the seat unit 21 and the back unit 22. Each of the tube modules 232 includes a plurality of armrest tubes 233 detachably mounted on the two armrest portions 511 and a plurality of angled connecting members 234 connected between the armrest tubes 233.

The cushion mechanism 2 further includes four linear passages 405 formed in the two seat plates 211 and the two backrest plates 221 and an endless passage 407 formed in the two seat plates 211 and the two backrest plates 221. The linear passages 405 surround the endless passage 407. The linear passages 405 in the two seat plates 211 are connected to each other. The linear passages 405 in the two backrest plates 221 are connected to each other. The first endless cord 51 has two spaced insertion sections 512 inserted into the linear passages 405. Each of the two insertion sections 512 has two ends connected with the two armrest sections 511. The second endless cord 52 is inserted into the endless passage 407.

The cushion mechanism 2 further includes four through holes 406 extending through the two seat plates 211 and the two backrest plates 221. The through holes 406 are connected to the linear passages 405. The first endless cord 51 extends through the through holes 406. The endless passage 407 has a plurality of recesses 408 formed in the two seat plates 211 and the two backrest plates 221. The recesses 408 are connected mutually.

The connecting mechanism 5 further includes a plurality of mounting tubes 53 received in the linear passages 405 and the recesses 408 of the endless passage 407 and mounted on the first endless cord 51 and the second endless cord 52. The two insertion sections 512 of the first endless cord 51 extend through the mounting tubes 53 in the linear passages 405. The second endless cord 52 extends through the mounting tubes 53 in the recesses 408 of the endless passage 407.

Accordingly, the cushion mechanism 2 is swung and moved along the folding lines so that the foldable cushion 1 is expanded and folded easily and conveniently. In addition, the first endless cord 51 and the second endless cord 52 are retained in the first endless groove 401 and the second endless groove 402 so that the cushion mechanism 2 is kept at the expanded state steadily by support of the first endless cord 51 and the second endless cord 52. Further, the foldable cushion 1 has a reduced volume when the cushion mechanism 2 is folded, thereby facilitating packaging, carrying, storage, and transportation of the foldable cushion 1. Further, the first endless cord 51 and the second endless cord 52 are light so that the foldable cushion 1 has a light weight, thereby facilitating the user storing and carrying the foldable cushion 1. Further, the first endless cord 51 and the second endless cord 52 are dustproof so that the foldable cushion 1 is not dusted easily. Further, the first endless cord 51 and the second endless cord 52 are assembled easily.

The invention claimed is:

1. A foldable cushion comprising:
  a cushion mechanism and a connecting mechanism;
  wherein:
  the cushion mechanism includes a seat unit and a back unit;
  each of the seat unit and the back unit has a sheet plate shape;
  the seat unit and the back unit are juxtaposed and movable relative to each other along a transverse folding line;
  the connecting mechanism includes a first endless cord and a second endless cord;
  the first endless cord and the second endless cord respectively extend through the transverse folding line and are flexibly arranged on the seat unit and the back unit;
  the first endless cord surrounds the second endless cord; and
  when the seat unit and the back unit are moved outward relative to the transverse folding line, the first endless cord and the second endless cord are stretched, so that the seat unit and the back unit are positioned at an expanded state with a predetermined angle defined therebetween by an elastic force of the first endless cord and the second endless cord.

2. The foldable cushion as claimed in claim 1, wherein:
  the cushion mechanism further includes a first longitudinal folding line intersecting the transverse folding line;
  the seat unit includes two seat plates that are juxtaposed and movable relative to each other along the first longitudinal folding line;
  the back unit includes two backrest plates that are movable relative to each other along the first longitudinal folding line;
  the first endless cord and the second endless cord respectively extend through the first longitudinal folding line and are arranged on the two seat plates and the two backrest plates; and
  the cushion mechanism is foldable along the transverse folding line and the first longitudinal folding line from the expanded state to a folded state in which the two seat plates and the two backrest plates are overlapped and stacked.

3. The foldable cushion as claimed in claim 1, wherein:
  the cushion mechanism further includes a first longitudinal folding line intersecting the transverse folding line, and a second longitudinal folding line intersecting the transverse folding line and spaced from the first longitudinal folding line;
  the seat unit includes three seat plates that are juxtaposed and movable relative to each other along the first longitudinal folding line and the second longitudinal folding line;
  the back unit includes three backrest plates that are movable relative to each other along the first longitudinal folding line and the second longitudinal folding line;
  the first endless cord and the second endless cord respectively extend through the first longitudinal folding line and the second longitudinal folding line, and are arranged on the two seat plates and the two backrest plates; and
  the cushion mechanism is foldable along the transverse folding line, the first longitudinal folding line and the second longitudinal folding line from the expanded state to a folded state in which the two seat plates and the two backrest plates are overlapped and stacked.

4. The foldable cushion as claimed in claim 2, wherein the first endless cord has two armrest sections, and the two armrest sections are stretched and exposed from the seat unit and the back unit when the cushion mechanism is disposed at the expanded state.

5. The foldable cushion as claimed in claim 2, wherein:
the cushion mechanism further includes two arm units respectively juxtaposed to the seat unit and the back unit;
the two arm units are located at two opposite sides of each of the seat unit and the back unit;
each of the two arm units includes two arm plates that are juxtaposed and movable relative to each other along the transverse folding line;
the first endless cord and the second endless cord respectively extend through the seat unit, the back unit, and the two arm units;
when the cushion mechanism is changed from the folded state to the expanded state, the first endless cord and the second endless cord are stretched, and the seat unit, the back unit, and the two arm units are driven and expanded by the first endless cord and the second endless cord, so that the two seat plates of the seat unit, the two backrest plates of the back unit, and the two arm plates of each of the two arm units are juxtaposed with a predetermined angle therebetween.

6. The foldable cushion as claimed in claim 5, wherein:
the cushion mechanism further includes a first endless groove and a second endless groove each formed in the seat unit, the back unit, and the two arm units;
the first endless cord is retained in the first endless groove; and
the second endless cord is retained in the second endless groove.

7. The foldable cushion as claimed in claim 6, wherein:
the first endless groove has a plurality of first slots respectively formed in the two seat plates of the seat unit, the two backrest plates of the back unit, and the two arm plates of each of the two arm units;
the first slots are connected to each other;
the second endless groove has a plurality of second slots respectively formed in the two seat plates of the seat unit, the two backrest plates of the back unit, and the two arm plates of each of the two arm units;
the second slots are connected to each other; and
the connecting mechanism further includes a plurality of mounting tubes received in the first slots and the second slots and mounted on the first endless cord and the second endless cord.

8. The foldable cushion as claimed in claim 4, wherein the cushion mechanism further includes two tube modules mounted on the two armrest portions and arranged between the seat unit and the back unit, and each of the tube modules includes a plurality of armrest tubes detachably mounted on the two armrest portions.

9. The foldable cushion as claimed in claim 8, wherein:
the cushion mechanism further includes four linear passages formed in the two seat plates and the two backrest plates and an endless passage formed in the two seat plates and the two backrest plates;
the linear passages surround the endless passage;
the linear passages in the two seat plates are connected to each other;
the linear passages in the two backrest plates are connected to each other;
the first endless cord has two spaced insertion sections inserted into the linear passages;
each of the two insertion sections has two ends connected with the two armrest sections; and
the second endless cord is inserted into the endless passage.

10. The foldable cushion as claimed in claim 9, wherein:
the endless passage has a plurality of recesses formed in the two seat plates and the two backrest plates;
the recesses are connected mutually; and
the connecting mechanism further includes a plurality of mounting tubes received in the linear passages and the recesses of the endless passage and mounted on the first endless cord and the second endless cord.

* * * * *